United States Patent
Hirokami et al.

(10) Patent No.: US 11,691,994 B2
(45) Date of Patent: Jul. 4, 2023

(54) AQUEOUS SOLUTION COMPOSITION CONTAINING ORGANOSILICON COMPOUNDS

(71) Applicant: Shin-Etsu Chemical Co., Ltd., Tokyo (JP)

(72) Inventors: Munenao Hirokami, Annaka (JP); Tetsuro Yamada, Annaka (JP); Kazuhiro Tsuchida, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/849,234

(22) Filed: Jun. 24, 2022

(65) Prior Publication Data

US 2023/0021428 A1    Jan. 26, 2023

(30) Foreign Application Priority Data

Jun. 25, 2021    (JP) .............................. JP2021-105391

(51) Int. Cl.
| | | |
|---|---|---|
| *C07F 7/07* | (2006.01) | |
| *C07F 7/08* | (2006.01) | |
| *C07F 7/18* | (2006.01) | |
| *D06M 13/513* | (2006.01) | |

(52) U.S. Cl.
CPC .......... *C07F 7/0834* (2013.01); *C07F 7/1804* (2013.01); *D06M 13/513* (2013.01)

(58) Field of Classification Search
CPC ................................ D06M 13/513; C07F 7/18
See application file for complete search history.

(56) References Cited

U.S. PATENT DOCUMENTS

| | | | | |
|---|---|---|---|---|
| 4,842,766 A * | 6/1989 | Blehm | ................. | A61K 8/0291 987/110 |
| 5,110,784 A * | 5/1992 | Williams | ............... | B01J 20/286 210/198.3 |
| 5,226,954 A * | 7/1993 | Suzuki | ..................... | C09K 3/18 106/287.16 |
| 8,815,351 B2 * | 8/2014 | Owens | ................ | D06M 10/003 427/553 |
| 2003/0180440 A1 * | 9/2003 | Elfersy | .................... | D06P 1/64 427/2.1 |
| 2009/0176424 A1 * | 7/2009 | Owens | .................. | B82Y 30/00 428/447 |
| 2011/0293542 A1 * | 12/2011 | Nikawa | ................. | A01N 33/12 556/413 |
| 2016/0199266 A1 * | 7/2016 | Blizzard | ................... | C07F 7/04 424/78.27 |
| 2020/0329711 A1 | 10/2020 | Liang et al. | | |
| 2020/0347544 A1 * | 11/2020 | Li | ............................ | D06M 11/00 |
| 2021/0355324 A1 * | 11/2021 | Inoue | ..................... | C09D 5/024 |
| 2023/0022811 A1 * | 1/2023 | Hirokami | .............. | C07F 7/1804 |

FOREIGN PATENT DOCUMENTS

| | | | | |
|---|---|---|---|---|
| CN | 104004192 A | | 8/2014 | |
| DE | 2730009 A | * | 1/1979 | ............. B01D 37/02 |
| EP | 2 744 847 B1 | | 10/2018 | |
| JP | 59192776 A | * | 11/1984 | |
| JP | 2011-98976 A | | 5/2011 | |
| JP | 2011098976 A | * | 5/2011 | ............. A01N 25/08 |
| WO | WO 2015/141516 A1 | | 9/2015 | |
| WO | WO-2015141516 A1 | * | 9/2015 | ............. A01N 33/12 |
| WO | WO 2021/195199 A1 | | 9/2021 | |
| WO | WO-2021195199 A1 | * | 9/2021 | ............. A01N 33/12 |
| WO | WO-2022051762 A2 | * | 3/2022 | |

OTHER PUBLICATIONS

Extended European Search Report for European Application No. 22180440.4, dated Nov. 3, 2022.

* cited by examiner

*Primary Examiner* — Alexander R Pagano
(74) *Attorney, Agent, or Firm* — Birch, Stewart, Kolasch & Birch, LLP

(57) ABSTRACT

An aqueous solution composition containing a co-hydrolysate or a co-hydrolytic condensate of an organosilicon compound of formula (1) and an organosilicon compound of formula (2), or both the co-hydrolysate and the co-hydrolytic condensate:

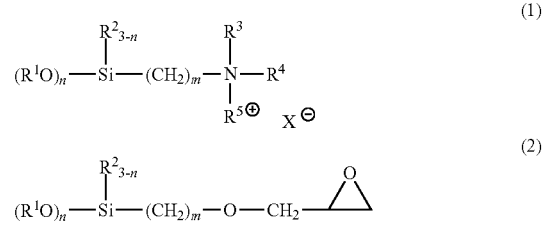

wherein $R^1$ and $R^2$ are each independently an alkyl group having 1 to 10 carbon atoms or an aryl group having 6 to 10 carbon atoms, $R^3$ is an alkyl group having 12 to 24 carbon atoms, $R^4$ and $R^5$ are each independently an alkyl group having 1 to 6 carbon atoms, X is a halogen atom, m is an integer of 1 to 20, and n is an integer of 1 to 3.

4 Claims, No Drawings

AQUEOUS SOLUTION COMPOSITION CONTAINING ORGANOSILICON COMPOUNDS

CROSS-REFERENCE TO RELATED APPLICATION

This non-provisional application claims priority under 35 U.S.C. § 119(a) on Patent Application No. 2021-105391 filed in Japan on Jun. 25, 2021, the entire contents of which are hereby incorporated by reference.

TECHNICAL FIELD

The present invention relates to an aqueous solution composition containing a co-hydrolysate and/or the like of specific organosilicon compounds.

BACKGROUND ART

In recent years, antiviral trend has increased, and a long-acting antiviral agent is desired. For example, a composition containing octadecyldimethyl(3-trialkoxysilylpropyl)ammonium chloride as a main component is known as an immobilizable antiviral agent (Patent Documents 1 and 2).

An aqueous solution composition obtained by hydrolyzing octadecyldimethyl(3-trialkoxysilylpropyl)ammonium chloride and removing the produced alcohol is commercially available and used. But there is a disadvantage that when trying to obtain a high-concentration aqueous solution composition, it tends to gelate. There is also a problem that even a low-concentration aqueous solution composition may generate a precipitate over time. Therefore, a highly stable aqueous solution composition of a quaternary ammonium salt functional group-containing organosilicon compound has been desired.

CITATION LIST

Patent Document 1: JP-A 2011-98976
Patent Document 2: WO 2015/141516

SUMMARY OF THE INVENTION

An object of the present invention is to provide an aqueous solution composition containing a quaternary ammonium salt functional group-containing organosilicon compound and having high storage stability.

As a result of intensive studies to achieve the above-mentioned object, the inventors have found that an aqueous solution composition containing a co-hydrolysate and/or the like of specific organosilicon compounds is excellent in storage stability, and have completed the present invention.

In one aspect, the present invention provides an aqueous solution composition containing a co-hydrolysate or a co-hydrolytic condensate of an organosilicon compound of formula (1) and an organosilicon compound of formula (2), or both the co-hydrolysate and the co-hydrolytic condensate:

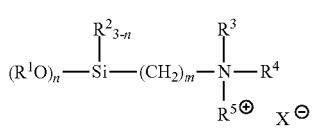

(1)

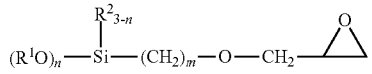

(2)

wherein $R^1$ and $R^2$ are each independently an alkyl group having 1 to 10 carbon atoms or an aryl group having 6 to 10 carbon atoms, $R^3$ is an alkyl group having 12 to 24 carbon atoms, $R^4$ and $R^5$ are each independently an alkyl group having 1 to 6 carbon atoms, X is a halogen atom, m is an integer of 1 to 20, and n is an integer of 1 to 3.

The aqueous solution composition preferably has an alcohol content of 0.3% by weight or less with respect to the entire aqueous solution composition.

In another aspect, the invention provides an article treated with the aqueous solution composition.

Advantageous Effects of the Invention

The aqueous solution composition of the present invention is excellent in storage stability, and can inhibit gelation and generation of a precipitate. Moreover, treating an article such as fibers using the aqueous solution composition of the present invention can impart antiviral properties to the article.

DESCRIPTION OF THE PREFERRED EMBODIMENT

Hereinafter, the present invention is specifically described.

The aqueous solution composition of the present invention contains a co-hydrolysate and/or a co-hydrolytic condensate of an organosilicon compound of formula (1) and an organosilicon compound of formula (2).

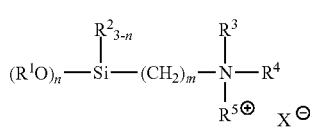

(1)

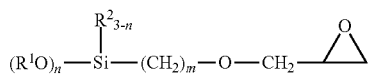

(2)

The alkyl group having 1 to 10 carbon atoms, preferably 1 to 8 carbon atoms, more preferably 1 to 6 carbon atoms as $R^1$ may be linear, branched, or cyclic, and specific examples thereof include methyl, ethyl, n-propyl, isopropyl, n-butyl, isobutyl, s-butyl, t-butyl, n-pentyl, n-hexyl, and cyclohexyl groups.

Specific examples of the aryl group having 6 to 10 carbon atoms, preferably 6 to 8 carbon atoms include a phenyl and a tolyl groups.

Among them, an alkyl group having 1 to 3 carbon atoms is preferred, and a methyl group or an ethyl group is more preferred for $R^1$.

Examples of the alkyl group having 1 to 10 carbon atoms and the aryl group having 6 to 10 carbon atoms as $R^2$ include groups same as those mentioned for $R^1$, and among them, a methyl group is more preferred.

The alkyl group having 12 to 24 carbon atoms, preferably 12 to 20 carbon atoms, more preferably 12 to 18 carbon atoms as $R^3$ may be linear, branched, or cyclic, and specific examples thereof include n-dodecyl, 2-methylundecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, and cyclododecyl groups. Among them, an alkyl group having 14 to 18 carbon atoms is preferred for $R^3$, and a n-octadecyl group is more preferred for $R^3$ from the viewpoint of availability of raw materials and environmental load during use.

The alkyl group having 1 to 6 carbon atoms as $R^4$ and $R^5$ may be linear, branched, or cyclic, and specific examples thereof include methyl, ethyl, n-propyl, isopropyl, n-butyl, isobutyl, s-butyl, t-butyl, n-pentyl, n-hexyl, and cyclohexyl groups. Among them, an alkyl group having 1 to 3 carbon atoms is preferred for both $R^4$ and $R^5$, and a methyl group is more preferred for $R^4$ and $R^5$ from the viewpoint of availability of raw materials and environmental load during use.

m represents an integer of 1 to 20, and is preferably an integer of 3 to 12. If m is more than 20, the quaternary ammonium salt content per unit mass is reduced, so that the antiviral properties are reduced.

Examples of the halogen atom as X include a chlorine atom and a bromine atom.

Specific examples of the organosilicon compound of formula (1) include octadecyldimethyl(1-trimethoxysilylmethyl)ammonium chloride, octadecyldimethyl(1-triethoxysilylmethyl)ammonium chloride, octadecyldimethyl(3-trimethoxysilylpropyl)ammonium chloride, octadecyldimethyl(3-triethoxysilylpropyl)ammonium chloride, octadecyldimethyl(4-trimethoxysilylbutyl)ammonium chloride, octadecyldimethyl(4-triethoxysilylbutyl)ammonium chloride, octadecyldimethyl(6-trimethoxysilylhexyl)ammonium chloride, octadecyldimethyl(6-triethoxysilylhexyl)ammonium chloride, octadecyldimethyl(8-trimethoxysilyloctyl)ammonium chloride, octadecyldimethyl(8-triethoxysilyloctyl)ammonium chloride, octadecyldimethyl(8-dimethoxymethylsilyloctyl)ammonium chloride, octadecyldimethyl(8-diethoxymethylsilyloctyl)ammonium chloride, octadecyldimethyl(10-trimethoxysilyldecyl)ammonium chloride, octadecyldimethyl(10-triethoxysilyldecyl)ammonium chloride, octadecyldimethyl(11-trimethoxysilylundecyl)ammonium chloride, octadecyldimethyl(11-triethoxysilylundecyl)ammonium chloride, octadecyldimethyl(12-trimethoxysilyldodecyl)ammonium chloride, and octadecyldimethyl(12-triethoxysilyldodecyl)ammonium chloride. These may be used alone or in combination of two or more kinds thereof.

Among them, octadecyldimethyl(3-trimethoxysilylpropyl)ammonium chloride, octadecyldimethyl(3-triethoxysilylpropyl)ammonium chloride, octadecyldimethyl(4-trimethoxysilylbutyl)ammonium chloride, octadecyldimethyl(6-triethoxysilylhexyl)ammonium chloride, octadecyldimethyl(8-trimethoxysilyloctyl)ammonium chloride, octadecyldimethyl(8-triethoxysilyloctyl)ammonium chloride, octadecyldimethyl(8-dimethoxymethylsilyloctyl)ammonium chloride, octadecyldimethyl(8-diethoxymethylsilyloctyl)ammonium chloride, and octadecyldimethyl(11-trimethoxysilylundecyl)ammonium chloride are preferred, and octadecyldimethyl(3-trimethoxysilylpropyl)ammonium chloride, octadecyldimethyl(3-triethoxysilylpropyl)ammonium chloride, octadecyldimethyl(8-trimethoxysilyloctyl)ammonium chloride, octadecyldimethyl(8-triethoxysilyloctyl)ammonium chloride, octadecyldimethyl(8-dimethoxymethylsilyloctyl)ammonium chloride, and octadecyldimethyl(8-diethoxymethylsilyloctyl)ammonium chloride are more preferred.

The organosilicon compound of formula (1) is obtained by reacting an organosilicon compound of formula (A) with a tertiary amine of formula (B) in an air atmosphere or an atmosphere of an inert gas such as nitrogen.

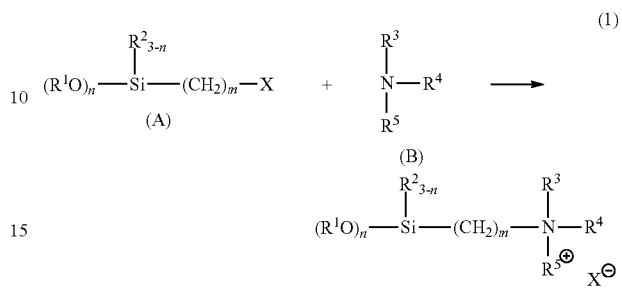

In the formulae, $R^1$, $R^2$, $R^3$, $R^4$, $R^5$, X, m, and n are as defined above.

Examples of the compound of formula (A) include chloromethyltrimethoxysilane, chloromethyltriethoxysilane, 3-chloropropyltrimethoxysilane, 3-chloropropyltriethoxysilane, 4-chlorobutyltrimethoxysilane, 4-chlorobutyltriethoxysilane, 4-bromobutyltrimethoxysilane, 4-bromobutyltriethoxysilane, 6-chlorohexyltrimethoxysilane, 6-chlorohexyltriethoxysilane, 6-bromohexyltrimethoxysilane, 6-bromohexyltriethoxysilane, 8-chlorooctyltrimethoxysilane, 8-chlorooctyltriethoxysilane, 8-chlorooctyldimethoxymethylsilane, 8-chlorooctyldiethoxymethylsilane, 8-bromooctyltrimethoxysilane, 8-bromooctyltriethoxysilane, 8-bromooctyldimethoxymethylsilane, 8-bromooctyldiethoxymethylsilane, 10-chlorodecyltrimethoxysilane, 10-chlorodecyltriethoxysilane, 10-bromodecyltrimethoxysilane, 10-bromodecyltriethoxysilane, 11-chloroundecyltrimethoxysilane, 11-chloroundecyltriethoxysilane, 11-bromoundecyltrimethoxysilane, 11-bromoundecyltriethoxysilane, 12-chlorododecyltrimethoxysilane, 12-chlorododecyltriethoxysilane, 12-bromododecyltrimethoxysilane, and 12-bromododecyltriethoxysilane. These can be used alone or in combination of two or more kinds thereof.

Among them, 3-chloropropyltrimethoxysilane, 3-chloropropyltriethoxysilane, 4-chlorobutyltrimethoxysilane, 4-chlorobutyltriethoxysilane, 6-chlorohexyltrimethoxysilane, 6-chlorohexyltriethoxysilane, 8-chlorooctyltrimethoxysilane, 8-chlorooctyltriethoxysilane, 8-chlorooctyldimethoxymethylsilane, 8-chlorooctyldiethoxymethylsilane, 11-chloroundecyltrimethoxysilane, and 11-chloroundecyltriethoxysilane are preferred, and 3-chloropropyltrimethoxysilane, 3-chloropropyltriethoxysilane, 8-chlorooctyltrimethoxysilane, 8-chlorooctyltriethoxysilane, 8-chlorooctyldimethoxymethylsilane, and 8-chlorooctyldiethoxymethylsilane are more preferred.

Examples of the tertiary amine of formula (B) include dodecyldimethylamine, dodecyldiethylamine, tridecyldimethylamine, tridecyldiethylamine, tetradecyldimethylamine, tetradecyldiethylamine, pentadecyldimethylamine, pentadecyldiethylamine, hexadecyldimethylamine, hexadecyldiethylamine, heptadecyldimethylamine, heptadecyldiethylamine, octadecyldimethylamine, octadecyldiethylamine, nonadecyldimethylamine, nonadecyldiethylamine, eicosyldimethylamine, eicosyldiethylamine, heneicosyldimethylamine, heneicosyldiethylamine, docosyldimethylamine, docosyldiethylamine, tricosyldimethylamine, tricosyldiethylamine, tetracosyldimethylamine, and tetracosyldiethylamine. These can be used alone or in combination of two or more kinds thereof.

Among them, octadecyldimethylamine and octadecyldiethylamine are preferred, and octadecyldimethylamine is more preferred.

The above-mentioned reaction can be carried out in the absence of a solvent, but can also be carried out in an alcohol solvent such as methanol or ethanol if necessary as long as the reaction is not inhibited.

The reaction temperature is preferably 80 to 150° C., and more preferably 100 to 130° C. The reaction time is preferably 1 to 30 hours, and more preferably 5 to 25 hours.

In the reaction, the use ratio of the organosilicon compound of formula (A) to the tertiary amine of formula (B) is preferably 0.7 to 1.3 mol of the organosilicon compound (A) to 1 mol of the tertiary amine (B).

Specific examples of the organosilicon compound of formula (2) include 3-glycidoxypropyltrimethoxysilane, 3-glycidoxypropyltriethoxysilane, 3-glycidoxypropylmethyldimethoxysilane, 3-glycidoxypropylmethyldiethoxysilane, 6-glycidoxyhexyltrimethoxysilane, 6-glycidoxyhexyltriethoxysilane, 6-glycidoxyhexylmethyldimethoxysilane, 6-glycidoxyhexylmethyldiethoxysilane, 8-glycidoxyoctyltrimethoxysilane, 8-glycidoxyoctyltriethoxysilane, 8-glycidoxyoctylmethyldimethoxysilane, and 8-glycidoxyoctylmethyldiethoxysilane. These may be used alone or in combination of two or more kinds thereof.

The ratio between the organosilicon compound of formula (1) and the organosilicon compound of formula (2) is not particularly limited, but from the viewpoint of storage stability and productivity, the amount of the organosilicon compound of formula (2) is preferably 0.1 to 100 mol, more preferably 0.5 to 20 mol, and still more preferably 1 to 10 mol with respect to 1 mol of the organosilicon compound of formula (1).

The aqueous solution composition of the present invention is obtained by diluting the organosilicon compound of formula (1) and the organosilicon compound of formula (2) with water in an air atmosphere or an atmosphere of an inert gas such as nitrogen, and hydrolyzing a part or all of groups represented by Si—$OR^1$ ($R^1$ is the same as described above) in formulae (1) and (2) to silanol groups (Si—OH groups). In addition, water may be added continuously during the hydrolysis reaction, or may be added before starting the reaction. An alcohol solution of the organosilicon compound of formula (1) obtained by the above-mentioned reaction can be used as it is in the hydrolysis reaction.

The temperature of the hydrolysis reaction is preferably 50 to 110° C., and more preferably 60 to 105° C. The reaction time is preferably 1 to 30 hours, and more preferably 5 to 25 hours.

An alcohol component ($R^1$OH ($R^1$ is the same as described above)) by-produced by the hydrolysis reaction and an alcohol component added together with water as needed in the hydrolysis reaction are preferably removed by a separation method such as distillation. The distillation is preferably performed simultaneously with the hydrolysis reaction.

The amount of the co-hydrolysate of the organosilicon compound of formula (1) and the organosilicon compound of formula (2) contained in the aqueous solution composition of the present invention is not particularly limited, but is preferably 0.1 to 50% by weight, and more preferably 10 to 40% by weight with respect to an entirety of the aqueous solution composition from the viewpoint of storage stability and productivity.

In addition, the aqueous solution composition of the present invention may contain a condensate that is produced by intermolecular condensation between silanol groups generated by the hydrolysis of the organosilicon compound of formula (1) and the organosilicon compound of formula (2), or may contain both a hydrolysate and a hydrolytic condensate.

The amount of alcohol contained in the aqueous solution composition of the present invention is preferably 0.3% by weight or less, and more preferably 0.1% by weight or less with respect to an entirety of the aqueous solution composition from the viewpoint of safety. The amount of alcohol in the aqueous solution composition can be determined by gas chromatography (GC) analysis.

The aqueous solution composition of the present invention may contain an organic acid such as citric acid, an additive such as a surfactant, and the like as long as the object of the present invention is not impaired, and it is preferred to add an organic acid such as citric acid from the viewpoint of storage stability of the aqueous solution.

The aqueous solution composition of the present invention can be applied to various materials, articles, and the like to impart antibacterial properties and antiviral properties to such materials, articles, and the like. Specific examples of the materials and articles include various fiber materials including natural fibers such as cotton, silk, and wool, regenerated fibers such as rayon, semi-synthetic fibers such as acetate, synthetic fibers such as vinylon, polyester, nylon, polyethylene, polypropylene, polyurethane, and polyaramid fibers, and composite fibers of these fibers (such as polyester/cotton); various metal materials including iron, stainless steel, aluminum, nickel, zinc, and copper; various synthetic resin materials including an acrylic resin, a phenol resin, an epoxy resin, a polycarbonate resin, and a polybutylene terephthalate resin; various inorganic materials including glass, titanium, ceramic, cement, and mortar; and various articles made from these materials.

EXAMPLES

Hereinafter, the present invention is described in more detail with reference to Synthesis Examples, Examples, and Comparative Examples, but the present invention is not limited to these Examples.

Synthesis of Organosilicon Compound

Synthesis Example 1-1

In a 300-mL pressurized reaction vessel purged with nitrogen, 39.7 g of 3-chloropropyltrimethoxysilane, 59.6 g of octadecyldimethylamine (LIPOMIN DM18D, manufactured by Lion Corporation, the same applies hereinafter), and 99.3 g of methanol were charged, and reacted at 120° C. for 20 hours. After the reaction, filtration was performed to obtain 190 g of a methanol solution of octadecyldimethyl (3-trimethoxysilylpropyl)ammonium chloride (solid content concentration: 50% by weight).

Synthesis Example 1-2

In a 300-mL pressurized reaction vessel purged with nitrogen, 53.8 g of 8-chlorooctyltrimethoxysilane, 59.6 g of octadecyldimethylamine, and 113 g of methanol were charged, and reacted at 120° C. for 20 hours. After the reaction, filtration was performed to obtain 220 g of a methanol solution of octadecyldimethyl(8-trimethoxysilyloctyl)ammonium chloride (solid content concentration: 50% by weight).

Production of Aqueous Solution Composition

Example 1-1

In a 1000-mL pressurized reaction vessel purged with nitrogen, 50 g of the methanol solution of octadecyldimethyl(3-trimethoxysilylpropyl)ammonium chloride (solid content concentration: 50% by weight) obtained in Synthesis Example 1-1, 70 g of 3-glycidoxypropyltrimethoxysilane (KBM-403, manufactured by Shin-Etsu Chemical Co., Ltd., the same applies hereinafter), 500 g of ion-exchanged water, and 2 g of citric acid were charged. The water-methanol mixed solvent was distilled off until the internal temperature reached 100° C., and then ion-exchanged water was added so that the concentration became 30% by weight, thereby obtaining an aqueous solution composition A.

The obtained aqueous solution composition had a transparent appearance, and methanol was not detected in the GC analysis.

Example 1-2

In a 1000-mL pressurized reaction vessel purged with nitrogen, 80 g of the methanol solution of octadecyldimethyl(3-trimethoxysilylpropyl)ammonium chloride (solid content concentration: 50% by weight) obtained in Synthesis Example 1-1, 50 g of 3-glycidoxypropyltrimethoxysilane, 500 g of ion-exchanged water, and 2 g of citric acid were charged. The water-methanol mixed solvent was distilled off until the internal temperature reached 100° C., and then ion-exchanged water was added so that the concentration became 30% by weight, thereby obtaining an aqueous solution composition B.

The obtained aqueous solution composition had a transparent appearance, and methanol was not detected in the GC analysis.

Example 1-3

In a 1000-mL pressurized reaction vessel purged with nitrogen, 30 g of the methanol solution of octadecyldimethyl(3-trimethoxysilylpropyl)ammonium chloride (solid content concentration: 50% by weight) obtained in Synthesis Example 1-1, 90 g of 3-glycidoxypropyltrimethoxysilane, 500 g of ion-exchanged water, and 2 g of citric acid were charged. The water-methanol mixed solvent was distilled off until the internal temperature reached 100° C., and then ion-exchanged water was added so that the concentration became 30% by weight, thereby obtaining an aqueous solution composition C.

The obtained aqueous solution composition had a transparent appearance, and methanol was not detected in the GC analysis.

Example 1-4

In a 1000-mL pressurized reaction vessel purged with nitrogen, 50 g of the methanol solution of octadecyldimethyl(8-trimethoxysilyloctyl)ammonium chloride (solid content concentration: 50% by weight) obtained in Synthesis Example 1-2, 70 g of 3-glycidoxypropyltrimethoxysilane, 500 g of ion-exchanged water, and 2 g of citric acid were charged. The water-methanol mixed solvent was distilled off until the internal temperature reached 100° C., and then ion-exchanged water was added so that the concentration became 30% by weight, thereby obtaining an aqueous solution composition D.

The obtained aqueous solution composition had a transparent appearance, and methanol was not detected in the GC analysis.

Comparative Example 1-1

In a 500-mL pressurized reaction vessel purged with nitrogen, 10 g of the methanol solution of octadecyldimethyl(3-trimethoxysilylpropyl)ammonium chloride (solid content concentration: 50% by weight) obtained in Synthesis Example 1-1, 150 g of ion-exchanged water, and 0.4 g of citric acid were charged. The water-methanol mixed solvent was distilled off until the internal temperature reached 100° C., and then ion-exchanged water was added so that the concentration became 5% by weight, thereby obtaining an aqueous solution composition E.

The obtained aqueous solution composition had a transparent appearance, and methanol was not detected in the GC analysis.

Comparative Example 1-2

In a 500-mL pressurized reaction vessel purged with nitrogen, 100 g of the methanol solution of octadecyldimethyl(3-trimethoxysilylpropyl)ammonium chloride (solid content concentration: 50% by weight) obtained in Synthesis Example 1-1, 200 g of ion-exchanged water, and 0.4 g of citric acid were charged. When the water-methanol mixed solvent was distilled off until the internal temperature reached 100° C., the mixture was gelled during distillation.

Evaluation of Storage Stability

The aqueous solution compositions A to E obtained in Examples 1-1 to 1-4 and Comparative Example 1-1 were stored under sealed conditions at 50° C. for a predetermined period (1 week, 1 month, and 3 months), and then the appearance of the compositions was visually observed to evaluate the stability. A case where no precipitate was observed and the solution was transparent was evaluated as good, and a case where a precipitate was observed was evaluated as poor. The results are shown in Table 1.

TABLE 1

| | Aqueous solution composition | Stability (storage at 50° C.) | | |
|---|---|---|---|---|
| | | 1 week | 1 month | 3 months |
| Example 1-1 | A | good | good | good |
| Example 1-2 | B | good | good | good |
| Example 1-3 | C | good | good | good |
| Example 1-4 | D | good | good | good |
| Comparative Example 1-1 | E | poor | poor | poor |

Production of Treated Article

Examples 2-1 to 2-4 and Comparative Example 2-1

Each of the aqueous solution compositions A to E obtained in Examples 1-1 to 1-4 and Comparative Example 1-1 was further diluted with ion-exchanged water to a concentration of 0.5% by weight, 5 g of T/C fibers (polyester/cotton composite fibers) were immersed in each of the aqueous solution compositions A to E for 30 seconds, and the T/C fibers were taken out and dried at 80° C. for 10 minutes to produce treated T/C fibers.

Evaluation of Antiviral Properties

The obtained fibers were evaluated for antiviral properties by the following method. The evaluation was performed according to the virus reduction rate calculated by the following method. The results are shown in Table 2.

Fibers: T/C fibers treated with antiviral agent composition
Virus used: Influenza virus H1N1 IOWA strain
Culture cells: MDCK cells
Method for Preparing Virus Fluid:

The influenza virus was inoculated into the MDCK cells. After adsorption at 37° C. for 1 hour, a fluid of the inoculated virus was removed, and washed twice with sterile PBS. A MEM medium was added to the fluid, and the fluid was cultured at 37° C. in the presence of 5% $CO_2$ for 5 days. The culture supernatant was collected and centrifuged at 3000 rpm for 30 minutes, and then the centrifuged supernatant was dispensed and stored at −70° C. or lower to obtain a virus fluid.

Measurement of Virus Titer:

To the above-mentioned fibers, 0.4 mL of the virus fluid was added, and the fibers were sealed in a sterile vial. The fibers were allowed to stand at room temperature (25° C.) for a sensitization time of 2 hours. After the lapse of the sensitization time, 20 mL of a cell maintenance medium was added to the vial and mixed well to wash out the virus. The washout was further subjected to 10-fold serial dilution with a cell maintenance medium, and each of the diluted solutions was inoculated into the culture cells in a microplate and cultured at 37° C. for 5 days. Each of the culture solutions after the culture was collected, and whether the virus was proliferated was determined by a hemagglutination reaction to measure the virus titer (TCID50).

Virus Reduction Rate (%):

100×[(virus titer in untreated fibers−virus titer in the above-mentioned fibers)/(virus titer in untreated fibers)]

TABLE 2

| | Aqueous solution composition | Virus reduction rate (%) |
|---|---|---|
| Example 2-1 | A | 99.9 or more |
| Example 2-2 | B | 99.9 or more |
| Example 2-3 | C | 99.9 or more |
| Example 2-4 | D | 99.9 or more |
| Comparative Example 2-1 | E | 99.9 or more |

As shown in Tables 1 and 2, the aqueous solution compositions of Examples 1-1 to 1-4 were equivalent to the aqueous solution composition of Comparative Example 1-1 in the antiviral properties of the treated fibers, but were superior in storage stability to the aqueous solution composition of Comparative Example 1-1.

Japanese Patent Application No. 2021-105391 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An aqueous solution composition comprising a co-hydrolysate or a co-hydrolytic condensate of an organosilicon compound of formula (1) and an organosilicon compound of formula (2), or both the co-hydrolysate and the co-hydrolytic condensate:

$$(R^1O)_n-\underset{R^2_{3-n}}{Si}-(CH_2)_m-\underset{R^5^{\oplus}}{\overset{R^3}{N}}-R^4 \quad X^{\ominus} \quad (1)$$

$$(R^1O)_n-\underset{R^2_{3-n}}{Si}-(CH_2)_m-O-CH_2-\overset{O}{\underset{\triangle}{}} \quad (2)$$

wherein $R^1$ and $R^2$ are each independently an alkyl group having 1 to 10 carbon atoms or an aryl group having 6 to 10 carbon atoms, $R^3$ is an alkyl group having 12 to 24 carbon atoms, $R^4$ and $R^5$ are each independently an alkyl group having 1 to 6 carbon atoms, X is a halogen atom, m is an integer of 1 to 20, and n is an integer of 1 to 3.

2. The aqueous solution composition according to claim 1, wherein an alcohol content is 0.3% by weight or less with respect to the entire aqueous solution composition.

3. An article treated with the aqueous solution composition according to claim 1.

4. An article treated with the aqueous solution composition according to claim 2.

* * * * *